(12) United States Patent
Sagong et al.

(10) Patent No.: US 11,915,448 B2
(45) Date of Patent: Feb. 27, 2024

(54) METHOD AND APPARATUS WITH AUGMENTED REALITY POSE DETERMINATION

(71) Applicant: SAMSUNG ELECTRONICS CO., LTD., Suwon-si (KR)

(72) Inventors: Donghoon Sagong, Suwon-si (KR); Hojin Ju, Suwon-si (KR); Jaehwan Pi, Suwon-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 17/392,473

(22) Filed: Aug. 3, 2021

(65) Prior Publication Data

US 2022/0277476 A1  Sep. 1, 2022

(30) Foreign Application Priority Data

Feb. 26, 2021  (KR) .......................... 10-2021-0026726

(51) Int. Cl.
  *G06T 7/73* (2017.01)
  *G06T 7/246* (2017.01)
  *G06V 10/46* (2022.01)

(52) U.S. Cl.
  CPC .............. *G06T 7/74* (2017.01); *G06T 7/246* (2017.01); *G06V 10/462* (2022.01); *G06T 2207/30244* (2013.01)

(58) Field of Classification Search
  CPC .. G06T 7/246; G06T 7/70; G06T 7/73; G06T 7/74; G06T 2207/30244; G06V 10/44; G06V 10/462
  See application file for complete search history.

(56) References Cited

U.S. PATENT DOCUMENTS 9,430,847 B2   8/2016  Ramalingam et al.
10,147,399 B1  12/2018  Mott et al.
(Continued)

FOREIGN PATENT DOCUMENTS

EP   3 349 101 A1   7/2018
EP   3 494 447 B1   5/2021
(Continued)

OTHER PUBLICATIONS

Peng, et al. "PVNet: Pixel-wise Voting Network for 6DoF Pose Estimation." *Proceedings of the IEEE/CVF Conference on Computer Vision and Pattern Recognition*. Dec. 31, 2018. (10 pages in English).
(Continued)

*Primary Examiner* — Andrew W Johns
(74) *Attorney, Agent, or Firm* — NSIP Law

(57) ABSTRACT

A method and apparatus with pose determination are provided. The method includes determining first pose information of a computing apparatus dependent on motion sensor information of motion of the computing apparatus, estimating second pose information of the computing apparatus dependent on feature point position information that is pre-defined for an object, and one or more feature points of the object that are extracted from an image captured by the computing apparatus, determining respective reliability values of the first pose information and the second pose information, and determining a pose of the computing apparatus for augmented reality (AR) content based on the first pose information, the second pose information, and the respective reliability values. AR content may be generated based on the determined pose.

30 Claims, 8 Drawing Sheets

(56) References Cited

U.S. PATENT DOCUMENTS

| | | | |
|---|---|---|---|
| 10,740,924 B2 | 8/2020 | Balan et al. | |
| 2008/0048931 A1 | 2/2008 | Ben-Ari | |
| 2015/0235432 A1 | 8/2015 | Bronder et al. | |
| 2017/0357332 A1 | 12/2017 | Balan et al. | |
| 2019/0346271 A1 | 11/2019 | Zhang et al. | |
| 2019/0387152 A1 | 12/2019 | Sivan | |
| 2020/0066045 A1 | 2/2020 | Stahl et al. | |
| 2020/0327692 A1* | 10/2020 | Lin et al. | G06T 7/73 |

FOREIGN PATENT DOCUMENTS

| | | |
|---|---|---|
| JP | 2019-45364 A | 3/2019 |
| KR | 10-2014-0013034 A | 2/2014 |
| KR | 10-2018-0071962 A | 6/2018 |
| KR | 10-2018-0086218 A | 7/2018 |
| KR | 10-2020-0024848 A | 3/2020 |

OTHER PUBLICATIONS

Liu, et al. "ICE-Ba: Incremental, Consistent and Efficient Bundle Adjustment for Visual-Inertial Slam." *Proceedings of the IEEE Conference on Computer Vision and Pattern Recognition*, 2018, (9 pages in English).

Extended European Search Report dated May 11, 2022 in counterpart European Patent Application No. 21208611.0 (10 pages in English).

\* cited by examiner

METHOD AND APPARATUS WITH AUGMENTED REALITY POSE DETERMINATION

CROSS-REFERENCE TO RELATED APPLICATIONS

This application claims the benefit under 35 USC § 119(a) of Korean Patent Application No. 10-2021-0026726, filed on Feb. 26, 2021, in the Korean Intellectual Property Office, the entire disclosure of which is incorporated herein by reference for all purposes.

BACKGROUND

1. Field

The following description relates to methods and apparatuses with augmented reality pose determination.

2. Description of Related Art

Augmented reality (AR) may include a display technology of combining a virtual object or information with a physical environment of the real world, e.g., with an external physical foreground and/or background, and displaying the virtual object or information combined with the physical environment, while virtual reality (VR) may provide a virtual environment, and mixed reality (MR) may provide a mix of the virtual environment and the physical environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes determining first pose information of a computing apparatus dependent on motion sensor information of motion of the computing apparatus, estimating second pose information of the computing apparatus dependent on feature point position information that is pre-defined for an object, and one or more feature points of the object that are extracted from an image captured by the computing apparatus, determining respective reliability values of the first pose information and the second pose information, and determining a pose of the computing apparatus for augmented reality (AR) content based on the first pose information, the second pose information, and the respective reliability values.

The respective reliability values of the first pose information and the second pose information may be based on the motion sensor information and extraction information of the extracted one or more feature points.

The determining of the respective reliability values may include determining the respective reliability values based on a difference between a position of a feature point of the object at a current time estimated based on the motion sensor information and another position of the feature point of the object at the current time according to the extraction information.

The determining of the respective reliability values may include, in response to the difference satisfying a difference condition, determining a reliability value of the first pose information to be higher than a reliability value of the second pose information.

The determining of the respective reliability values may include, in response to at least one of the motion sensor information and the extraction information being updated, redetermining at least one of a reliability value of the first pose information and a reliability value of the second pose information.

The determining of the respective reliability values may include determining the respective reliability values based on a degree of motion of the computing apparatus according to the motion sensor information.

The determining of the respective reliability values may include, in response to the degree of motion satisfying a degree of motion condition, determining a reliability value of the first pose information to be higher than a reliability value of the second pose information.

The method may further include performing the extraction of the one or more feature points for the object, where the determining of the respective reliability values includes, in response to the performing of the extraction determining that the object is in the image and an image quality of the image being determined to satisfy an image quality condition, determining a reliability value of the second pose information to be higher than a reliability value of the first pose information.

The determining of the respective reliability values may include determining the respective reliability values using a Kalman filter.

The method may further include performing the extraction of the one or more feature points for the object, to extract a plurality of feature points for the object, where the determining of the respective reliability values includes determining a reliability value of each of the plurality of the feature points based on a motion speed of each of the plurality of feature points.

The determining of the pose of the computing apparatus may include determining the pose of the computing apparatus by combining the first pose information and the second pose information based on the respective reliability values.

The feature point position information may be three-dimensional (3D) coordinate information of reference feature points located on a surface of a corresponding reference object when the corresponding reference object is in a reference pose.

The method may further include performing the extraction of the one or more feature points for the object, to extract a plurality of feature points for the object, where the estimating of the second pose information includes estimating the second pose information based on a difference in position between feature points corresponding to each other among the extracted plurality of feature points and the reference feature points.

The determining of the first pose information may include determining the first pose information based on the motion sensor information, and feature points of the object extracted from a previous image.

The determining of the pose of the computing apparatus may include determining a feature value indicating a position and an orientation of the computing apparatus.

The method may further include displaying the AR content based on the feature value indicating the position and the orientation of the computing apparatus.

The method may further include estimating the motion sensor information of the computing apparatus using a motion sensor of the computing apparatus.

The method may further include obtaining a current image frame using an image sensor of the computing apparatus, and extracting the one or more feature points of the object from the current image frame.

In one general aspect, one or more embodiments include a non-transitory computer-readable storage medium storing instructions that, when executed by a processor, cause the processor to perform any one, any combination, or all operations or methods described herein.

In one general aspect, a computing apparatus includes a processor configured to determine first pose information of the computing apparatus dependent on motion sensor information of motion of the computing apparatus, estimate second pose information of the computing apparatus dependent on feature point position information that is pre-defined for an object, and one or more feature points of the object that are extracted from an image captured by the computing apparatus, determine respective reliability values of the first pose information and the second pose information based on the motion sensor information and extraction information of the extracted one or more feature points, and determine a pose of the computing apparatus for augmented reality (AR) content based on the first pose information, the second pose information, and the respective reliability values.

For the determining of the pose of the computing apparatus, the processor may be configured to determine a feature value indicating a position and an orientation of the computing apparatus.

The apparatus may further include a display, where the processor may be further configured to control a display of the AR content based on the feature value indicating the position and the orientation of the computing apparatus.

The apparatus may further include a motion sensor configured to estimate the motion sensor information.

The apparatus may further include an image sensor, where, to perform the extraction of the one or more features, the processor may be configured to obtain a current image frame using the image sensor, and extract the one or more feature points of the object from the current image frame.

For the determining of the respective reliability values, the processor may be configured to determine the respective reliability values based on a difference between a position of a feature point of the object at a current time estimated based on the motion sensor information and another position of the feature point of the object at the current time according to the extraction information, and based on determination of a reliability value of the first pose information to be higher than a reliability value of the second pose information when the difference satisfies a difference condition.

For the determining of the respective reliability values, the processor may be configured to determine the respective reliability values based on a degree of motion of the computing apparatus according to the motion sensor information, and based on a determination of a reliability value of the first pose information to be higher than a reliability value of the second pose information when the degree of motion satisfies a degree of motion condition.

The processor may be further configured to perform the extraction of the one or more feature points for the object, where, for the determining of the respective reliability values, the processor may be configured to determine a reliability value of the second pose information to be higher than a reliability value of the first pose information when the extraction indicates that the object is in the image and when an image quality of the image satisfies an image quality condition.

In one general aspect, a computing apparatus includes a motion sensor configured to measure motion information of the computing apparatus, an image sensor configured to capture an image, a display, and a processor configured to determine first pose information of the computing apparatus dependent on the motion information, estimate second pose information of the computing apparatus dependent on feature point position information that is pre-defined for an object, and one or more feature points of the object that are extracted from the image, determine respective reliability values of the first pose information and the second pose information, estimate a pose of the computing apparatus based on the first pose information, the second pose information, and the respective reliability values, generate AR content matching a real object based on the estimated pose, and control the display to display the generated AR content.

For the determining of the respective reliability values of the first pose information and the second pose information, the processor may be configured to determine the respective reliability values of the first pose information and the second pose information based on the motion information and extraction information of the extracted one or more feature points.

For the estimation of the pose of the computing apparatus, the processor may be configured to determine a feature value, indicating a position and an orientation of the computing apparatus, based on the first pose information, the second pose information, and the respective reliability values, where the processor may be configured to perform the generation of the AR content based on the feature value.

Other features and aspects will be apparent from the following detailed description, the drawings, and the claims.

Figure 1:
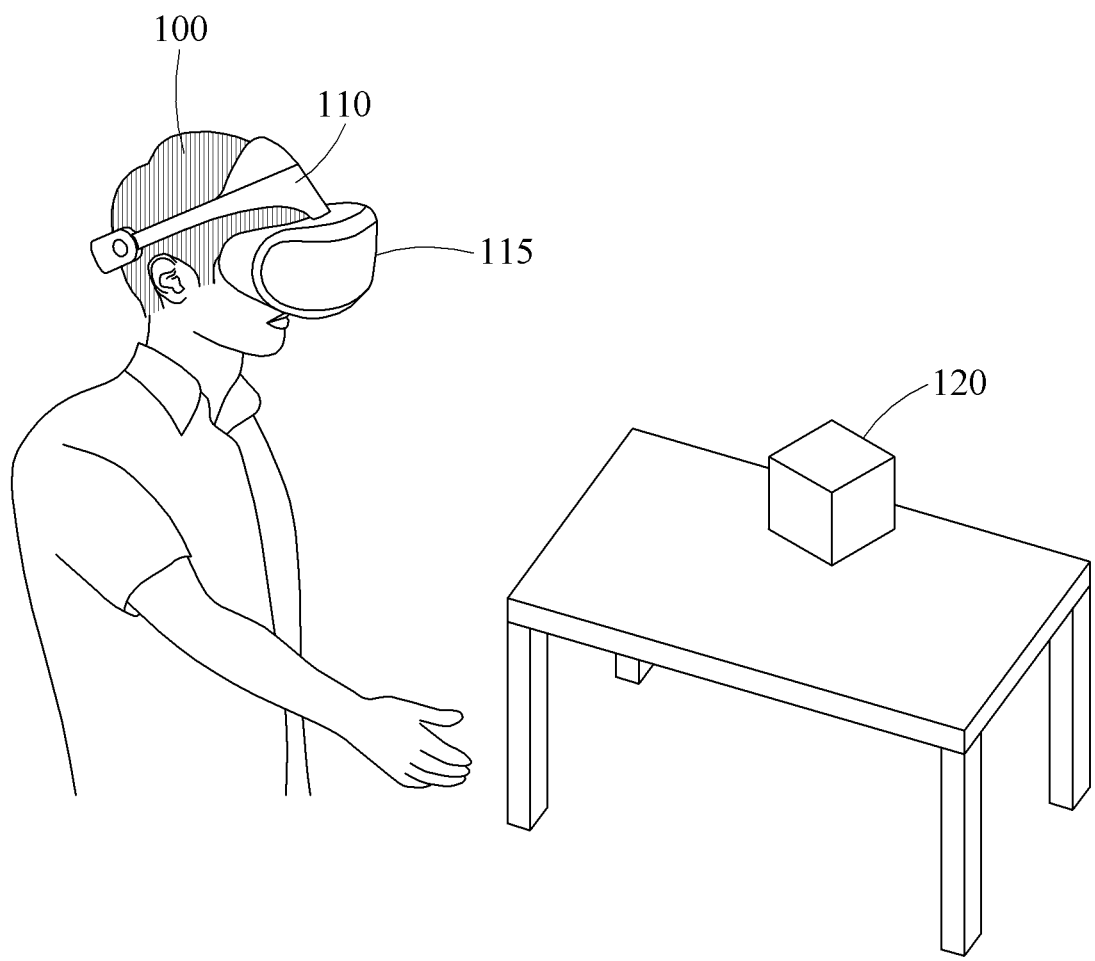
FIGS. 1 and 2 illustrate examples of an overview of an augmented reality (AR) provision by a computing apparatus, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or operational descriptions of examples disclosed in the present disclosure are merely intended for the purpose of describing the examples and describing that the examples may be implemented in various forms. The examples are not meant to be limited, but descriptions herein are intended to mean that various modifications, equivalents, and alternatives are also covered within this disclosure and the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art, and more importantly, as used in the present disclosure, and are not to be construed as an ideal or excessively formal meaning unless otherwise defined herein. The use of the term "may" herein with respect to an example or embodiment (e.g., as to what an example or embodiment may include or implement) means that at least one example or embodiment exists where such a feature is included or implemented, while all examples are not limited thereto.

Figure 2:
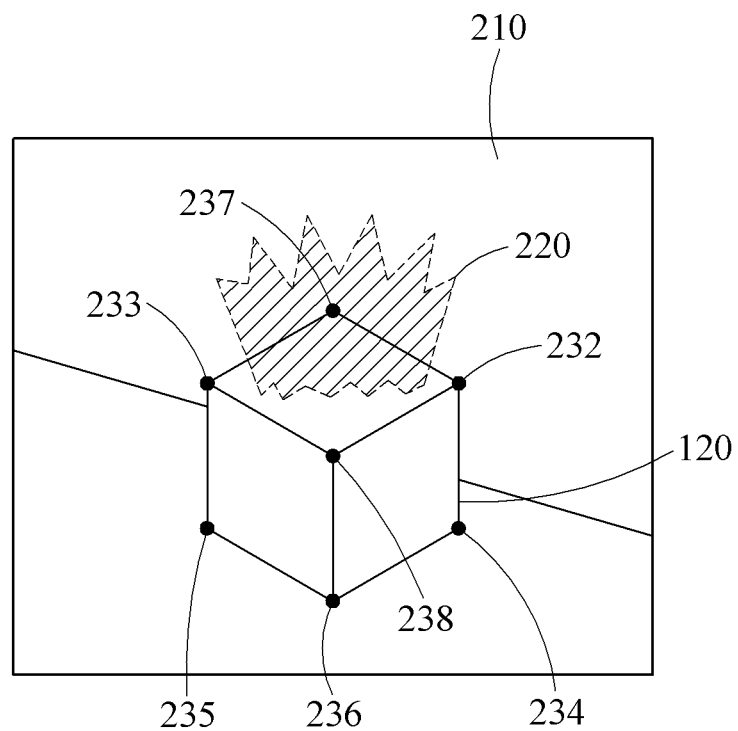

FIGS. 1 and 2 illustrate examples of an overview of an augmented reality (AR) provision by a computing apparatus, according to one or more embodiments. Herein, while references may be made to an AR providing apparatus, such as the AR providing apparatus 110 with respect to FIGS. 1-2 and the AR providing apparatus 800 of FIG. 8, or the pose determination apparatus represented by FIG. 3 or the pose determination apparatus 700 of FIG. 7, these different references are merely for convenience of explanation, and any of the AR providing apparatuses and the pose determination apparatuses may be a same or respective computing apparatuses that can perform the pose determination, reliability determinations, and/or AR provisions, noting that such examples further include such computing apparatuses performing additional operations in addition to such AR related operations.

Referring to FIG. 1, an AR providing apparatus 110 may be such a computing apparatus configured to provide an AR service to a user 100, e.g., among other operations performed by the computing apparatus. The AR service may be a service that overlays a virtual image on an image or other viewing of a real world seen by the user 100. The AR providing apparatus 110 may provide a user with a virtual image that includes content related to a real object 120 together with an image of the real world, e.g., using a display 115. A virtual image seen by the user 100 may be, for example, a two-dimensional (2D) image, a three-dimensional (3D) image, a fixed image, or a dynamic image such as an animation, as non-limiting examples. The AR providing apparatus 110 may be, for example, a mobile device or a wearable device worn by the user 100 such as a glasses type device or a head-mounted display (HMD), as non-limiting examples.

FIG. 2 illustrates an example of AR content 210 provided through the display 115 of the AR providing apparatus 110. The AR content 210 may be formed by matching a virtual image 220 including virtual information, and the object 120 in the real world seen by the user 100. The AR content 210 may be, for example, replicating a realistic virtual object from the object 120 in the real world, or implementing a virtual computer graphics effect on the object 120 (for example, implementing additional information, such as a user manual, as a virtual image on a real machine), as non-limiting examples.

For example, when the user 100 moves his or her head or gaze, a gaze direction in which a user looks at the object 120 may change, and the virtual image 220 may be finely adjusted based on a change in the gaze direction to provide the user 100 with the AR content 210 with a high precision, for example. In this example, for natural matching between the object 120 and the virtual image 220, the change in the gaze direction may be precisely measured, for example. As another example, to implement realistic AR content, the virtual image 220 may be displayed at an accurate position in a scene in which the user 100 looks at the object 120.

The AR providing apparatus 110 may be the above-noted computing apparatus configured to determine a pose of the AR providing apparatus 110 and control provision of AR content to the user among other operations of the computing apparatus, or may be such a computing apparatus that is specially configured to perform the pose determination and for inclusion in another computing apparatus described herein that may use or rely on the determined pose to implement or provide AR content among other operations of the computing apparatus. Merely for convenience of explanation and a non-limiting example, the latter example may be described, e.g., where the pose determination apparatus may determine the pose of the pose determination apparatus or of the AR providing apparatus, and the AR providing apparatus uses or relies on the determined pose to provide AR content, e.g., among other operations and functions of the AR providing apparatus. Thus, in such an example, the pose determination apparatus may perform localization of the AR providing apparatus 110, and a localization result may be used to estimate a head motion of the user 100 or to estimate a direction in which the user 100 is looking. The pose of the AR providing apparatus 110 determined by the pose determination apparatus may include information about a position and an orientation of the AR providing apparatus 110, and may be represented by six degrees of freedom (6DoF), for example. The pose of the AR providing apparatus 110 may correspond to a pose of the user 100 or a pose of an image sensor (for example, a camera) included in the AR providing apparatus 110.

The pose determination apparatus may determine the pose of the AR providing apparatus 110 based on image data obtained by an image sensor and motion data obtained by a motion sensor. The pose determination apparatus may use the image data and the motion data together, for example, to accurately and effectively estimate the pose of the AR providing apparatus 110. The image sensor and the motion sensor may be included in the AR providing apparatus 110. The image sensor may obtain image data by capturing at least a portion (for example, a frontal view or area of the user 100) in a surrounding area or environment of the AR providing apparatus 110. The motion sensor may measure a motion of the user 100 or the AR providing apparatus 110, and may include an inertial measurement unit (IMU) sensor including an acceleration sensor and a gyro sensor, for example.

The pose determination apparatus may determine first pose information of the AR providing apparatus 110 based on the motion data and may determine second pose information of the AR providing apparatus 110 based on the image data. The first pose information may correspond to a motion sensor-based pose measurement value, and the second pose information may correspond to an image sensor-based pose measurement value.

The pose determination apparatus may determine the first pose information by reflecting a motion measured from a previous time to a current time to a position of the AR providing apparatus 110 at the previous time. The pose determination apparatus may estimate a pose based on advance (e.g., predetermined prior to the pose determination operation) information about the object 120 to determine the second pose information. The advance information may include 3D coordinate information of reference feature points located on a surface of the object 120 when the object 120 is in a reference pose. Using the advance information, the second pose information may be quickly and precisely determined. As illustrated in FIG. 2, the pose determination apparatus may extract feature points 232, 233, 234, 235, 236, 237, and 238 of the object 120 from the image data obtained by capturing the object 120, may compare positions of the extracted feature points 232 to 238 and positions of the reference feature points of the object 120 that are defined in advance as advance information, and may determine the second pose information. Herein, a feature point may also be referred to as a "landmark". Subsequently, the pose determination apparatus may determine a reliability value of each of the first pose information and the second pose information and may determine a final pose of the AR providing apparatus 110 based on the determined reliability value.

Figure 3:
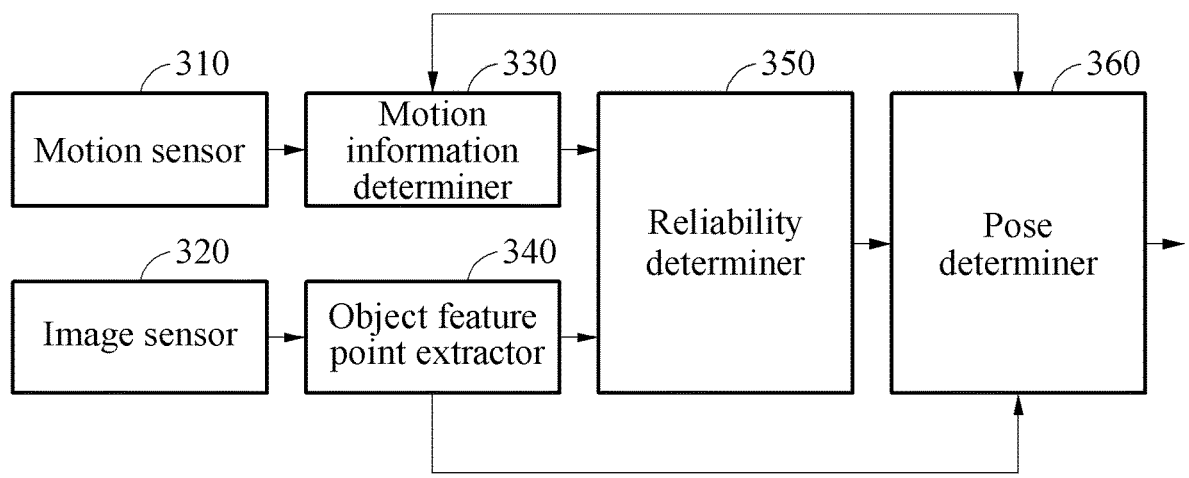
FIG. 3 illustrates an example of a computing apparatus with pose determination, according to one or more embodiments.

FIG. 3 illustrates an example of a computing apparatus with pose determination, according to one or more embodiments.

Referring to FIG. 3, the pose determination apparatus may include a motion information determiner 330, an object feature point extractor 340, a reliability determiner 350, and a pose determiner 360. The motion information determiner 330, object feature point extractor 340, reliability determiner 350, and pose determiner 360 may be respectively representative of separate processors, respectively representative of any combination of such separate processors, or may be representative of respective operations of one or more of such processors. The pose determination apparatuses and/or the AR providing apparatuses illustrated in FIGS. 1-8 are also representative of respective memories that store instructions, which when executed by the processor(s) may configure the same to implement one or more or all pose determination operations described herein, as well as the provision of AR content based on the determined pose, and as well as other operations of the AR providing apparatuses. Thus, the pose determination apparatus may determine a pose of an AR providing apparatus (for example, the AR providing apparatus 110 of FIG. 1) based on sensing information of a motion sensor 310 (for example, an IMU sensor) and sensing information of an image sensor 320.

The motion sensor 310 may include an acceleration sensor and a gyro sensor, for example, and may be included in the pose determination apparatus or the AR providing apparatus. Acceleration measurement information measured by the acceleration sensor and angular speed measurement information measured by the gyro sensor may be transferred or made available to the motion information determiner 330. The motion information determiner 330 may receive or obtain a motion measurement value of the AR providing apparatus from the motion sensor 310 and may estimate motion information of the AR providing apparatus based on the received or obtained motion measurement value.

The motion information determiner 330 may estimate motion information (for example, acceleration information, speed information, or angular speed information) of the AR providing apparatus based on the sensing information of the motion sensor 310 and may update the motion information, e.g., update stored motion information or store the updated motion information. The motion information determiner 330 may obtain a measurement value of an acceleration and/or a speed associated with a translational motion of the AR providing apparatus from the acceleration sensor, and may calculate an acceleration and a speed of a motion of the AR providing apparatus based on the obtained measurement value. The motion information determiner 330 may obtain a measurement value of an angular speed associated with a rotational motion of the AR providing apparatus from the gyro sensor, and may calculate an angular speed of a motion of the AR providing apparatus based on the obtained measurement value. The motion information determiner 330 may transfer the estimated motion information of the AR providing apparatus to the pose determiner 360, or the pose determiner 360 may merely read the same from memory of the pose determination apparatus or the AR providing apparatus. The motion information determiner 330 may receive or obtain correction information to correct a determined error of the motion information from the pose determiner 360, and may correct calculation of the motion information based on the received or obtained correction information. Through the above correcting, the motion information of the AR providing apparatus may be more accurately determined, e.g., compared to examples without such correcting.

The image sensor 320 may include at least one camera and may obtain image data of a color image or a black-and-white image. The image data obtained by the image sensor 320 may include a plurality of image frames obtained in different times, e.g., sequentially captured image frames. The image data obtained by the image sensor 320 may be transferred to, or otherwise obtained by, the object feature point extractor 340.

The object feature point extractor 340 may extract feature points of an object from the image data. The object feature point extractor 340 may detect positions of the feature points of the object defined in advance (e.g., predetermined prior to the pose determination operation) in the image data as 2D coordinates. The object feature point extractor 340 may use, for example, a Harris conner feature point detection algorithm, a scale-invariant feature transform (SIFT) feature point detection algorithm, and/or a neural network-based feature point detection algorithm, to extract the feature points. However, the examples are not limited to the above feature point detection algorithms and various additional or other feature point detection algorithms may also be used in various examples.

The reliability determiner 350 may receive, or otherwise obtain, the motion information from the motion information determiner 330 and receive, or otherwise obtain, extraction information of the feature points, which is information about the extracted feature points of the object, from the object feature point extractor 340, to determine a reliability value, e.g., in real time. The reliability determiner 350 may determine a reliability value (or an importance) of each of first pose information of the AR providing apparatus estimated based on the motion information and second pose information of the AR providing apparatus estimated based on a feature point extraction result. A reliability value of the first pose information may be an estimation value or a probability value indicating to what extent the first pose information is reliable or accurate, and a reliability value of the second pose information may be an estimation value or a probability value indicating to what extent the second pose information is reliable or accurate. In addition, a reliability value may be determined to indicate to what extent the first pose information is more or less reliable than the second pose information, or to what extent the second pose information is more or less reliable than the first pose information. In an example, the reliability value may be used as a weighting of one, or respective weightings of both, of the first pose information and the second pose information to determine a final pose determination, for example.

The first pose information may be determined by applying a movement value of the AR providing apparatus based on the motion information to pose information of the AR providing apparatus determined at a previous time, such as in an immediate previous sampling time of the motion sensor 310. The second pose information may be determined based on a result of a comparison between positions of the feature points extracted by the object feature point extractor 340 and positions of reference feature points defined in advance for the matched object. Information on a predefined feature point position may include 3D coordinate information of reference feature points located on a surface of a known object when the object is in a reference pose. The pose determination apparatus may store shape information of the object in advance of the pose determination based on advance information, and the object may be regarded to be stationary. The advance information may be generated by defining feature points of an object in advance as reference feature points prior to the pose determination operation, and by recording 3D position information of reference feature points when the object is in the reference pose. The second pose information may be derived by comparing positions of feature points extracted from image data to positions of reference feature points when an object is in the reference pose. For example, the second pose information may be estimated based on matching information between the extracted feature points and the reference feature points that are in a matched correspondence relationship.

The first pose information based on the motion information, and the second pose information based on the extraction information may provide different achievements or different gradations of achievement. For example, the second pose information may help achieve an accurate correct estimation of a pose of the AR providing apparatus based on positions of feature points of an object when a quality of image data is not reduced or is slightly reduced, e.g., compared to a full resolution and/or when the image quality is determined to be high according to a corresponding threshold. The first pose information may help reduce a decrease in the accuracy of a pose estimation result even though a quality of the image data may be reduced, such as due to a motion of the image sensor 320. For example, when a portion or all portions of an object deviates from image data, e.g., reference image data, an accuracy of the second pose information may decrease. However, the above decrease in the accuracy of the second pose information may be supplemented through the first pose information that is dependent on the motion information. Also, obtaining of the image data and determining of the second pose information from the image data may have a relatively high latency in comparison to obtaining of the motion information and determining of the first pose information from the motion information. For example, the motion information by the motion sensor 310 may be sampled or captured multiple times during a single frame sampling or capturing of image information by the image sensor 320. Using the first pose information dependent on the motion information, it may be possible to quickly determine the pose of the AR providing apparatus in a situation in which a quick pose determination may be desirable.

In an example, the reliability determiner 350 may determine a reliability value by implementing an algorithm that is based on a filter such as a Kalman filter. For example, the reliability value determined by the reliability determiner 350 may be determined as a value in a predetermined range between a minimum value and a maximum value that are experimentally determined, and may change over time. The reliability value determined by the reliability determiner 350 may be transferred to, or otherwise obtained by, the pose determiner 360.

The pose determiner 360 may determine pose information indicating a position and an orientation of the AR providing apparatus based on the first pose information, the second pose information, and the reliability value determined by the reliability determiner 350, and may output the determined final pose information. The pose information of the AR providing apparatus may correspond to pose information of the image sensor 320 or a viewing pose of the user. The pose information may be defined by variables (for example, x, y, z, Rx, Ry, and Rz) respectively representing 6DoF, and may be represented as a sixth-dimensional (6D) vector or a matrix corresponding to the 6D vector, as non-limiting examples.

A sampling period in which a motion measurement value is sampled/captured or output from the motion sensor 310, and a sampling period in which image data is sampled/captured or output from the image sensor 320 may be identical or different from each other. As a non-limiting example, when the sampling periods are different from each other, the motion measurement value may be sampled/captured or provided at an output frequency of 200 hertz (Hz) by the motion sensor 310, and the image data may be sampled/captured or provided at an output frequency of 30 Hz by the image sensor 320. In this example, final pose information may be output at an output frequency of 200 Hz from the pose determiner 360. For example, the pose determiner 360 may output the final pose information at an output frequency of whichever sampling frequency is the greatest among the motion sensor 310 and the image sensor 320.

The pose determination apparatus may enhance an accuracy of estimation of the final pose by adaptively using, based on the reliability value, the first pose information determined based on the motion information and the second pose information determined based on the image data depending on respectively determined circumstances of the respective sampled/captured motion and/or image data, for example. Since the pose determination apparatus may not calculate a pose by accumulating a relative motion variation over time, corresponding pose errors may not be accumulated over time. Thus, the pose determination apparatus may calculate a pose with a high accuracy. Also, the pose determination apparatus may use position information of reference feature points defined in advance for an object, to estimate a pose of the AR providing apparatus, which may thereby increase an accuracy of estimation of the pose.

Figure 4:
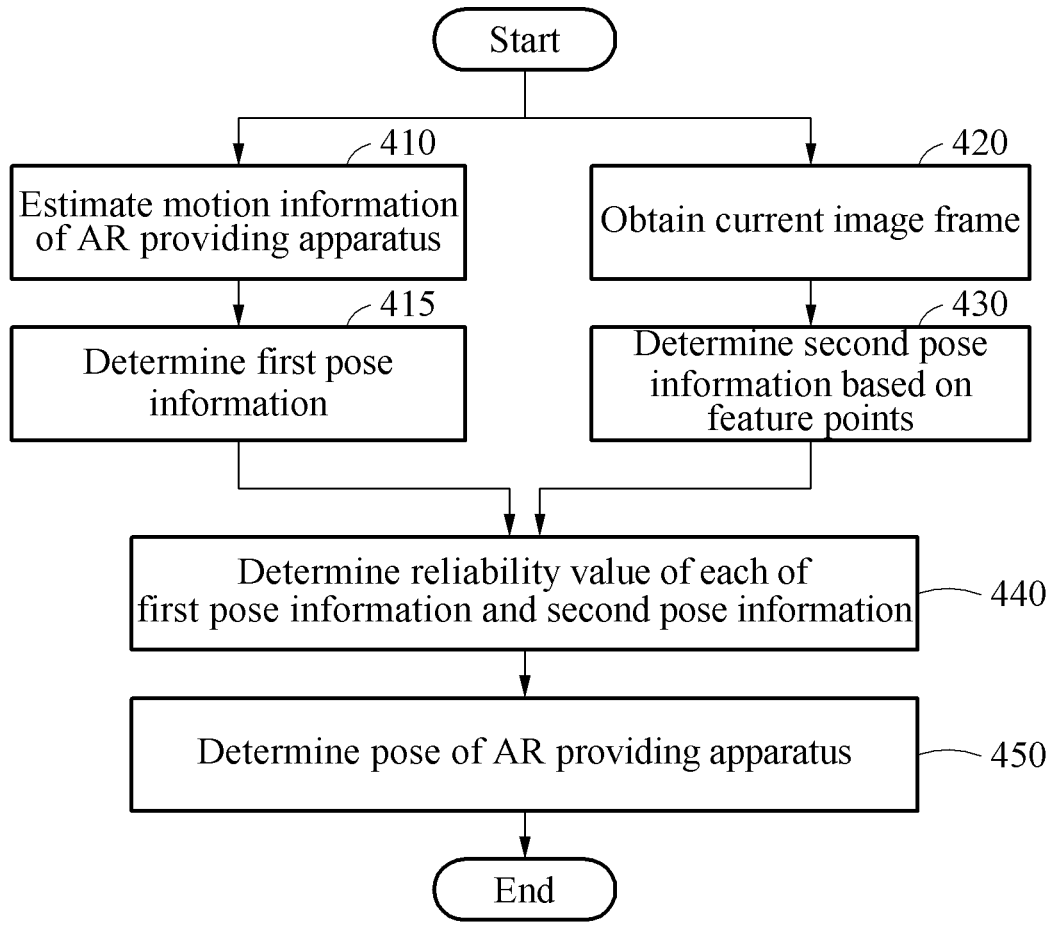
FIG. 4 illustrates an example determining of a pose of a computing apparatus, according to one or more embodiments.
Figure 5:
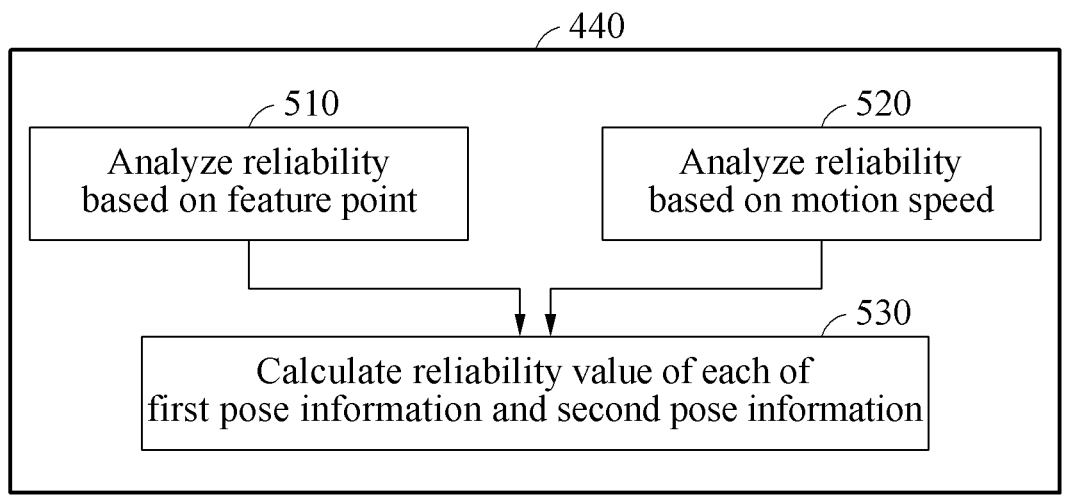
FIG. 5 illustrates an example determining of a reliability value, according to one or more embodiments.
Figure 6:
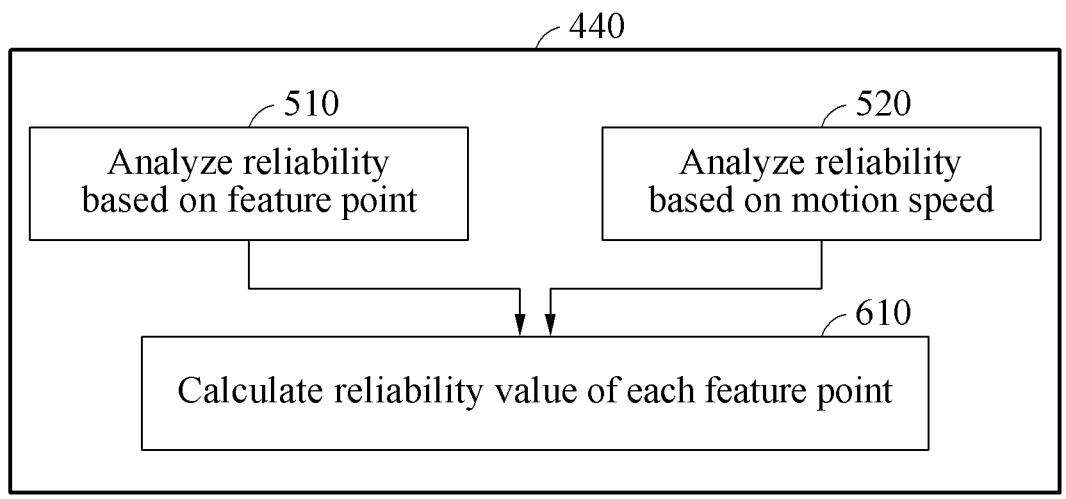
FIG. 6 illustrates an example determining of a reliability value, according to one or more embodiments.

FIGS. 4 to 6 illustrate examples of operations for determining a pose of an AR providing apparatus, which may be performed by any of the computing apparatuses described herein.

Referring to FIG. 4, in operation 410, the pose determination apparatus may estimate motion information of the AR providing apparatus using a motion sensor of the AR providing apparatus. The motion information of the AR providing apparatus may correspond to a motion of a user, for example, a motion of a gaze direction or a head of the user. The motion sensor may include an acceleration sensor configured to measure an acceleration value, and a gyro sensor configured to measure an angular speed value, for example. The pose determination apparatus may estimate an acceleration, a speed and an angular speed for a motion of the AR providing apparatus based on a motion measurement value (for example, an acceleration value, or an angular speed value) measured by the motion sensor.

In operation 415, the pose determination apparatus may determine first pose information of the AR providing apparatus based on the motion information of the AR providing apparatus. The pose determination apparatus may determine the first pose information based on the motion information and feature points of an object extracted from a previous image frame of a previous time. The pose determination apparatus may calculate how positions of the feature points change at a current time, by reflecting motion information measured between the previous time and the current time to position information of the feature points extracted from the previous image frame, and may determine first pose information at the current time based on a calculation result.

In operation 420, the pose determination apparatus may obtain a current image frame using an image sensor of the AR providing apparatus. The image sensor may obtain image data by capturing at least a partial area (for example, an area in the direction a user's head faces, or an area toward which a user's gaze is directed) of a surrounding environment of the AR providing apparatus. The image data may be obtained at predetermined time intervals, or obtained in a form of an image frame at each time interval.

In operation 430, the pose determination apparatus may extract feature points of an object from the current image frame and may determine second pose information of the AR providing apparatus based on the extracted feature points. The pose determination apparatus may determine whether a pre-defined object is in the current image frame, and may extract feature points of the object, e.g., when the pre-defined object is detected or matched. To determine the second pose information, advance information may be available about an object existing in a real (e.g., non-virtual) space. The advance information may include feature point position information pre-defined for feature points of an object. The feature point position information may be 3D coordinate information of reference feature points located on a surface of the object when the object is in a reference pose. Position information of the reference feature points may be obtained by determining positions of reference feature points in a result obtained by scanning an object in the real space using a 3D scanner, for example. The pose determination apparatus may determine the second pose information, based on a comparison result between 2D position information of the feature points extracted from the current image frame and 3D position information of pre-defined reference feature points. The pose determination apparatus may estimate the second pose information based on a difference between positions of feature points corresponding to each other among the feature points extracted from the current image frame and the reference feature points. There is no limitation to a number of reference feature points used to determine second pose information. In addition, a portion or all of reference feature points of an object may be used to determine the second pose information.

In operation 440, the pose determination apparatus may determine a reliability value of each of the first pose information and the second pose information based on the motion information and extraction information of the feature points. In an example, the pose determination apparatus may determine a reliability value based on an estimation covariance that is derived by performing a simultaneous localization and mapping (SLAM) operation using a Kalman filter. For example, when a magnitude of the estimation covariance increases, the reliability value may decrease, and when the magnitude of the estimation covariance decreases, the reliability value may increase. When any one or any combination of the motion information and the extraction information is updated, e.g., dependent on respective sampling frequencies, the pose determination apparatus may redetermine a reliability value of at least one of the respective first pose information and second pose information. Thus, the reliability value may change over time.

In an example, when a great motion of the AR providing apparatus is determined, e.g., greater than a predetermined motion threshold, the pose determination apparatus may set a reliability value of the first pose information that is based on the motion information to be high, and may set a reliability value of the second pose information that is based on the extraction information to be low. In another example, when an entire area of an object is determined to fully appear, or sufficiently appear according to a predetermined threshold, on the current image frame and when an image quality of the current image frame is determined to be relatively high, e.g., with respect to an image quality threshold, the pose determination apparatus may set the reliability value of the second pose information to be high, and may set the reliability value of the first pose information to be low. In another example, when an area of an object is determined to be cut off in the current image frame or when the image quality of the current image frame is determined to be relatively low, e.g., with respect to the image quality threshold or a lower image quality threshold, the pose determination apparatus may set the reliability value of the second pose information to be low, and may set the reliability value of the first pose information to be high.

In an example, the pose determination apparatus may determine a reliability value based on a determined difference between a position of a feature point of an object at a current time estimated based on the motion information and a position of the feature point of the object at the current time according to the extraction information. For example, when the difference satisfies a condition (for example, when the difference is greater than a corresponding difference threshold), the pose determination apparatus may determine the reliability value of the first pose information based on the motion information to be higher than the reliability value of the second pose information based on the extraction information. In another example, when an object is determined to be in the current image frame and when an image quality of the current image frame satisfies a condition (for example, when an image quality measurement value is greater than a corresponding image quality threshold), the pose determination apparatus may determine the reliability value of the second pose information to be higher than the reliability value of the first pose information. In another example, the pose determination apparatus may determine a reliability value based on a degree of motion of the AR providing apparatus according to the motion information. When the degree of motion of the AR providing apparatus satisfies a condition (for example, when the degree of motion is greater than a corresponding degree of motion threshold), the pose determination apparatus may determine the reliability value of the first pose information to be higher than the reliability value of the second pose information. In another example, the pose determination apparatus may also determine a reliability value of each of plural feature points of an object based on a motion speed of each of the plural feature points of the object.

Referring to FIG. 5, the pose determination apparatus may perform a process of analyzing a reliability based on a feature point, analyzing a reliability based on a motion speed, and determining a reliability value based on the results of the reliability analyses, to determine the reliability.

In operation 510, the pose determination apparatus may analyze a reliability based on feature points. The pose determination apparatus may compare a feature point position measurement value that is based on image data obtained by the image sensor and a feature point position measurement value that is based on motion information obtained by the motion sensor, and may analyze a reliability based on a difference or a residual between the feature point position measurement values. When a position of a feature point of an object at a current time estimated based on the motion information, and a position of the feature point of the object at the current time estimated according to the extraction information are greatly different, e.g., according to a corresponding difference threshold, from each other, the pose determination apparatus may assign a higher reliability value to the first pose information that is based on the motion information than the second pose information. This is because a pose measurement value of the second pose information derived based on the image sensor may be more greatly affected by a feature point detection performance of an object in an image frame. For example, when an object partially or completely deviates from an area captured by the image sensor, an accuracy of a position of a feature point of the object may sharply decrease, which may lead to a significant decrease in the feature point detection performance. In consideration of the above situation, when a position of a feature point determined based on the motion information, and a position of each of feature points extracted from an image frame are determined to be greatly different from each other, the pose determination apparatus may determine a reliability value indicating that the position of the feature point determined based on the motion information is more reliable.

In operation 520, the pose determination apparatus may analyze a reliability based on a motion speed of the AR providing apparatus or a user. When a relative motion speed of the AR providing apparatus with respect to an object is high, e.g., with respect to a corresponding motion speed threshold, the pose determination apparatus may set the reliability value of the second pose information based on the extraction information to be low. In a case of the determined high motion speed, an image quality of image data may decrease due to an image blur, and accordingly an accuracy of extraction information of feature points may decrease. Thus, in response to a high relative motion speed of the AR providing apparatus, the pose determination apparatus may lower the reliability value of the second pose information and may set the reliability value of the first pose information based on the motion information to be high, to prevent a pose from being inaccurately estimated due to a decrease in the image quality.

In operation 530, the pose determination apparatus may determine a reliability value of each of the first pose information and the second pose information based on the results of the respective reliability analyses obtained by operations 510 and 520. The pose determination apparatus may determine a reliability value in real time in a range of a minimum value to a maximum value of a predetermined reliability value. For example, the pose determination apparatus may determine a reliability value as a sum or a weighted sum of the difference between the feature point position measurement values used in operation 510 and the relative motion speed of the AR providing apparatus used in operation 520. A weight used as a weighted sum may be an experimentally determined value. The pose determination apparatus may also use a cumulative value or an average value of sums or weighted sums as a reliability value.

In an example of FIG. 5, all feature points of an object may have the same reliability value. In another example, the pose determination apparatus may determine a reliability value for each of plural feature points. For example, referring to FIG. 6, the pose determination apparatus may perform operations 510 and 520 in similar respective manners as described above with respect to FIG. 5, except that in operation 610, the pose determination apparatus may also determine a reliability value of each of the plural (or all) feature points of an object based on a motion speed of each of the feature points. Thus, different reliability values may also be assigned for each feature point. For example, when an object is assumed to have ten feature points, the ten feature points may have reliability values, for example, R1, R2, R3, through R10, that are respectively determined for each of the feature points, instead of having the single or same reliability value, for example, R discussed above with respect to FIG. 5. The pose determination apparatus may calculate a motion speed at a position of each of the feature points of the object and may calculate a reliability value of each of the feature points based on a magnitude of the calculated motion speed. The pose determination apparatus may determine a reliability value of each of the feature points as a sum or a weighted sum of the difference between the feature point position measurement values used in operation 510 and a motion speed at a position of a corresponding feature point.

Referring back to FIG. 4, in operation 450, the pose determination apparatus may determine the pose of the AR providing apparatus based on the first pose information, the second pose information, and the reliability value. The pose determination apparatus may determine a feature value indicating a position and an orientation of the AR providing apparatus, and the feature value may have 6DoF. The pose determination apparatus may combine the first pose information and the second pose information based on the reliability value of each of the first pose information and the second pose information, to determine the pose of the AR providing apparatus. For example, the pose determination apparatus may determine a final pose of the AR providing apparatus based on pose information with a higher reliability value, using the reliability value of each of the first pose information and the second pose information as a weight. Based on the final pose determined by the pose determination apparatus, the provision of the AR content may include adjustments of the visualizing of shapes and positions of a virtual image, e.g., in real time, based on the determined final pose of the AR providing apparatus.

Figure 7:
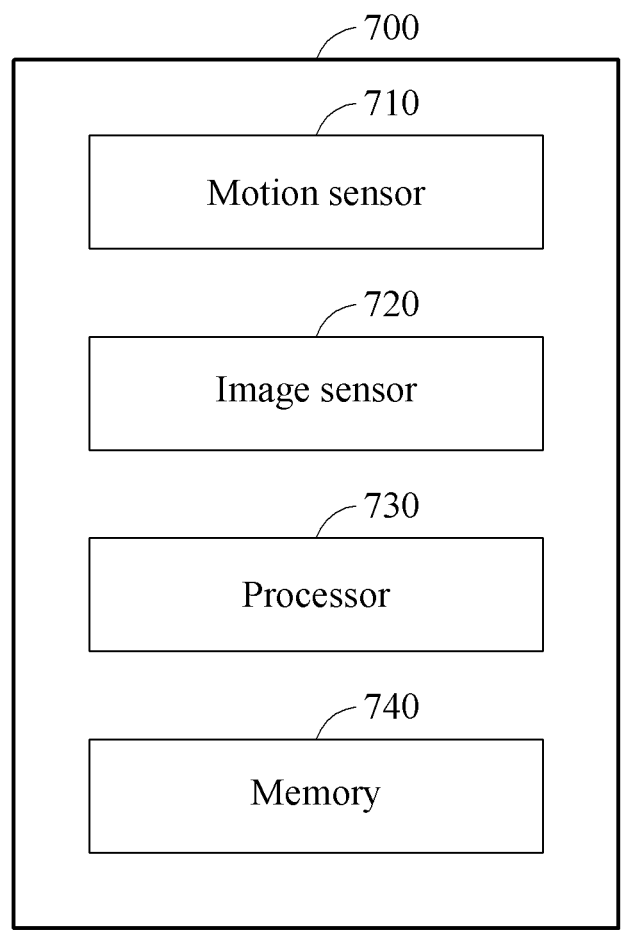
FIG. 7 illustrates an example of a computing apparatus with pose determination, according to one or more embodiments.

FIG. 7 illustrates an example computing apparatus with pose determination, according to one or more embodiments.

Figure 8:
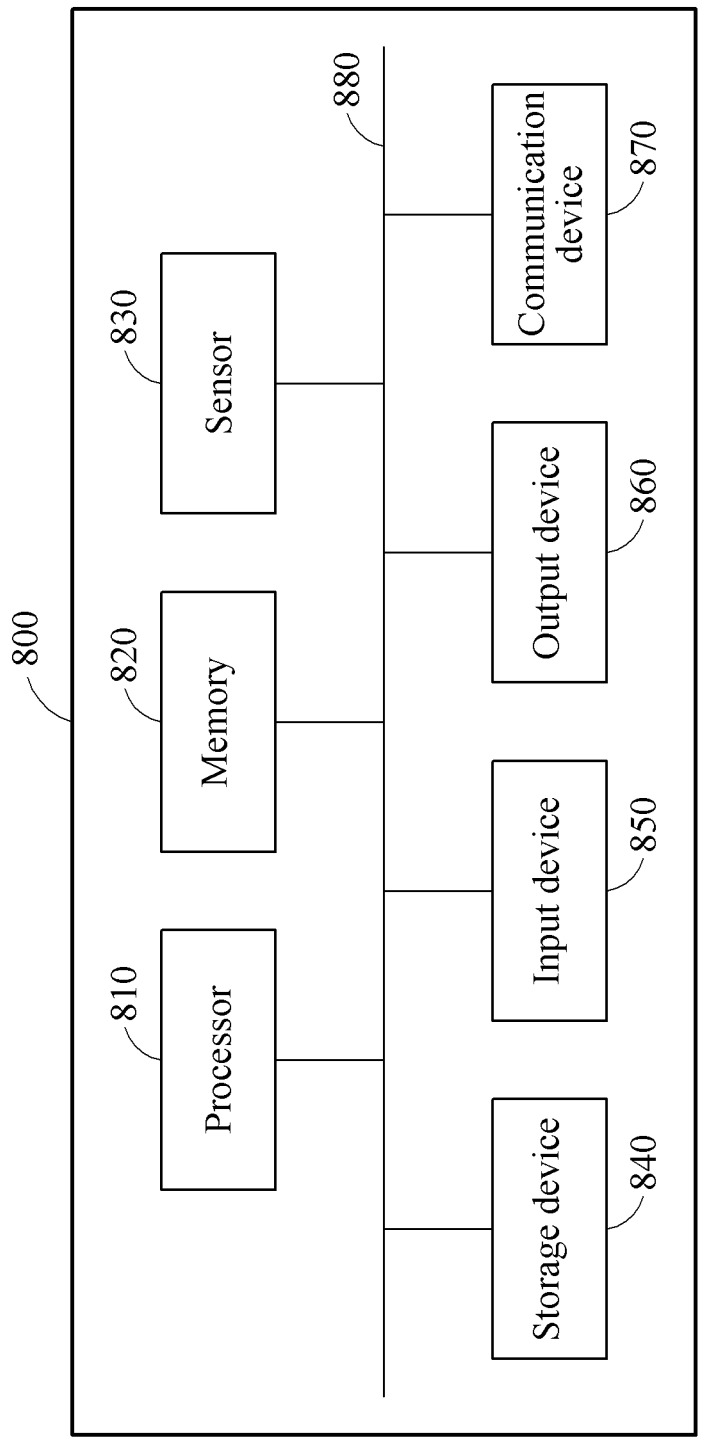
FIG. 8 illustrates an example of a computing apparatus with AR provision, according to one or more embodiments.

Referring to FIG. 7, the computing apparatus may be a pose determination apparatus 700 that may be configured to determine a pose of an AR providing apparatus, for example, the AR providing apparatus 110 of FIG. 1 or the AR providing apparatus 800 of FIG. 8, as non-limiting examples, and may operate in or separate from the AR providing apparatus. The pose determination apparatus 700 may include a motion sensor 710, an image sensor 720, a processor 730, and a memory 740.

The motion sensor 710 (for example, the motion sensor 310 of FIG. 3) may measure motion information indicating a motion of the AR providing apparatus. The motion of the AR providing apparatus may correspond to a head motion of a user or a motion in a gaze direction of the user. The motion sensor 710 may include an acceleration sensor and a gyro sensor, as examples, and may be included in the AR providing apparatus.

The image sensor 720 may obtain image data. The image sensor 720 (for example, the image sensor 320 of FIG. 3) may obtain a current image frame by capturing at least a portion of a surrounding environment of the AR providing apparatus. The image sensor 720 may include at least one camera and may be disposed at a predetermined position of the AR providing apparatus.

The memory 740 may store computer-readable instructions, as well as other stored information or data described herein. When the instructions stored in the memory 740 are executed by the processor 730, the processor 730 may become configured to perform one or more or all operations described herein. The memory 740 may include a non-transitory computer-readable storage medium or a non-transitory computer-readable storage device. The memory 740 may include, for example, a random-access memory (RAM), a dynamic random access memory (DRAM), a static random access memory (SRAM), or other forms of non-volatile memories.

The processor 730 may control an overall operation of the pose determination apparatus 700. The processor 730 may be a hardware-implemented apparatus, such as having a circuit that is physically structured to execute predetermined operations. For example, the predetermined operations may include the execution of stored instructions stored in the memory with respect to pose determination, as well as other programs or applications. The hardware-implemented apparatus may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU), as non-limiting examples.

The processor 730 may be configured to perform one or more or all operations described herein. For example, as noted above, the processor 730 may be representative of, or configured to implement the respective operations of, each of the motion information determiner 330, the object feature point extractor 340, the reliability determiner 350, and the pose determiner 360 of FIG. 3.

The processor 730 may determine a pose of the AR providing apparatus based on the motion information measured by the motion sensor 710 and the current image frame obtained by the image sensor 720. The processor 730 may determine first pose information of the AR providing apparatus based on the motion information. The processor 730 may extract feature points of an object from the current image frame and may estimate second pose information of the AR providing apparatus based on the extracted feature points and feature point position information that is predefined for the object.

The processor 730 may determine a reliability value of each of the first pose information and the second pose information respectively based on the motion information and the extraction information of the feature points. In an example, when a difference between a position of a feature point of the object at a current time estimated based on the motion information and a position of the feature point of the object at the current time according to the extraction information satisfies a predefined condition (for example, when the difference is greater than a corresponding difference threshold), the processor 730 may determine a reliability value of the first pose information to be higher than a reliability value of the second pose information. In another example, when a degree of motion of the AR providing apparatus according to the motion information satisfies a predefined condition (for example, when a variation in an acceleration or a speed is greater than a corresponding variation threshold), the processor 730 may determine the reliability value of the first pose information to be higher than the reliability value of the second pose information. In another example, when an object is in the current image frame and when an image quality of the current image frame is determined to satisfy a predefined condition (for example, when an image quality measurement value is determined to be greater than a corresponding image quality threshold), the processor 730 may determine the reliability value of the second pose information to be higher than the reliability value of the first pose information.

The processor 730 may determine a final pose of the AR providing apparatus based on the first pose information, the second pose information, and the reliability value. In an example, the processor 730 may combine the first pose information and the second pose information based on the reliability value of each of the first pose information and the second pose information, to determine the final pose of the AR providing apparatus. The processor 730 may use the reliability value of each of the first pose information and the second pose information as a weight, to determine the final pose. In another example, when the reliability value of the first pose information (in another example, the second pose information) is less than or equal to a predetermined value, the processor 730 may determine the final pose based on the second pose information (in the other example, the first pose information).

FIG. 8 illustrates an example of a computing apparatus with AR provision, according to one or more embodiments.

Referring to FIG. 8, an AR providing apparatus 800 may be an apparatus configured to provide AR content to a user, and may generate AR content by matching a real object and virtual content based on a pose of the AR providing apparatus 800 determined through the above-described pose determination process. The AR providing apparatus 800 may be configured to provide the AR content, as well as additional operations of the AR providing apparatus 800, such as other programs of applications that may or may not rely on the determined final pose. In varying example, the AR providing apparatus 800 may be an apparatus in various fields, for example, the AR providing apparatus 800 may be an advanced driver-assistance system (ADAS), a head-up display (HUD), a 3D digital information display (DID), a navigation device, a neuromorphic device, a 3D mobile device, a smartphone, a smart television (TV), a smart vehicle, an Internet of Things (IoT) device, a medical device, and a measuring device, as non-limiting examples. The 3D mobile device may include, for example, a display device configured to display AR, virtual reality (VR), and/or mixed reality (MR), a head-mounted display (HMD), a face-mounted display (FMD), and AR glasses, as non-limiting examples.

The AR providing apparatus 800 may include a processor 810, a memory 820, a sensor 830, a storage device 840, an input device 850, an output device 860, and a communication device 870. The above components of the AR providing apparatus 800 may communicate with each other via a communication bus 880.

The processor 810 may control an overall operation of the AR providing apparatus 800 and may execute instructions to cause the AR providing apparatus 800 to implement one or more or all operations described herein. The processor 810 may estimate a pose of the AR providing apparatus 800 based on motion information measured by the sensor 830, and may generate AR content matching a real object based on the estimated pose. The processor 810 may correspond to the processor 730 of FIG. 7, as a non-limiting example.

The memory 820 may store information used to perform operations implemented by the processor 810 and information resulting from the performed operations. For example, the memory 820 may store instructions, which when executed by the processor 810, configure the processor 810 to perform one or more or all operations described herein. The memory 820 may store information associated with additional programs or applications of the AR providing apparatus. The memory 820 may include, for example, a random-access memory (RAM), a dynamic random access memory (DRAM), a static random access memory (SRAM), or other forms of non-volatile memories. The memory 820 and/or the storage device 840 may correspond to the memory 740 of FIG. 7, as a non-limiting example.

The sensor 830 may include a motion sensor configured to measure motion information of the AR providing apparatus 800, and an image sensor configured to obtain a current image frame by capturing at least a portion of a surrounding environment of the AR providing apparatus 800. The motion sensor may include an IMU sensor, and the image sensor may include an image acquiring device, for example, a camera. The motion sensor may correspond to the motion sensor 710 of FIG. 7, and the image sensor may correspond to the image sensor 720 of FIG. 7, as a non-limiting example.

The storage device 840 may include a non-transitory computer-readable storage medium or a non-transitory computer-readable storage device. For example, the storage device 840 may a storage, a magnetic hard disk, an optical disk, or a flash memory.

The input device 850 may receive a user input from a user. For example, the input device 850 may include, for example, a keyboard, a mouse, a touch screen, a microphone, or other devices configured to detect a user input from a user and transmit the detected user input to the AR providing apparatus 800.

The output device 860 may provide a user with an output of the AR providing apparatus 800 through a visual channel, an auditory channel, and/or a tactile channel. The output device 860 may include, for example, a display, a touch screen, a speaker, a vibration generator, or other devices configured to provide a user with the output. The display may visualize and display AR content.

The communication device 870 may communicate with an external device via a wired network or a wireless network.

The computing apparatuses, the AR providing apparatuses, the pose determination apparatuses, the motion information determiner, the object feature point extractor, the reliability determiner, the pose determiner, the motion sensors, the image sensors, the processors, the memories, the storage devices, the input devices, the output devices, the communication device, the communication buses, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
    determining first pose information of a computing apparatus dependent on motion sensor information of motion of the computing apparatus;
    estimating second pose information of the computing apparatus dependent on feature point position information that is pre-defined for an object, and one or more feature points of the object that are extracted from an image captured by the computing apparatus;
    determining respective reliability values of the first pose information and the second pose information; and
    determining a pose of the computing apparatus for augmented reality (AR) content based on the first pose information, the second pose information, and the respective reliability values.

2. The method of claim 1, wherein the respective reliability values of the first pose information and the second pose information are based on the motion sensor information and extraction information of the extracted one or more feature points.

3. The method of claim 2, wherein the determining of the respective reliability values includes determining the respective reliability values based on a difference between a position of a feature point of the object at a current time estimated based on the motion sensor information and another position of the feature point of the object at the current time according to the extraction information.

4. The method of claim 3, wherein the determining of the respective reliability values includes, in response to the difference satisfying a difference condition, determining a reliability value of the first pose information to be higher than a reliability value of the second pose information.

5. The method of claim 2, wherein the determining of the respective reliability values includes, in response to at least one of the motion sensor information and the extraction information being updated, redetermining at least one of a reliability value of the first pose information and a reliability value of the second pose information.

6. The method of claim 1, wherein the determining of the respective reliability values includes determining the respective reliability values based on a degree of motion of the computing apparatus according to the motion sensor information.

7. The method of claim 6, wherein the determining of the respective reliability values includes, in response to the degree of motion satisfying a degree of motion condition, determining a reliability value of the first pose information to be higher than a reliability value of the second pose information.

8. The method of claim 1, further comprising performing the extraction of the one or more feature points for the object,
wherein the determining of the respective reliability values includes, in response to the performing of the extraction determining that the object is in the image and an image quality of the image being determined to satisfy an image quality condition, determining a reliability value of the second pose information to be higher than a reliability value of the first pose information.

9. The method of claim 1, wherein the determining of the respective reliability values include determining the respective reliability values using a Kalman filter.

10. The method of claim 1, further comprising performing the extraction of the one or more feature points for the object, to extract a plurality of feature points for the object,
wherein the determining of the respective reliability values includes determining a reliability value of each of the plurality of the feature points based on a motion speed of each of the plurality of feature points.

11. The method of claim 1, wherein the determining of the pose of the computing apparatus includes determining the pose of the computing apparatus by combining the first pose information and the second pose information based on the respective reliability values.

12. The method of claim 1, wherein the feature point position information is three-dimensional (3D) coordinate information of reference feature points located on a surface of a corresponding reference object when the corresponding reference object is in a reference pose.

13. The method of claim 12, further comprising performing the extraction of the one or more feature points for the object, to extract a plurality of feature points for the object,
wherein the estimating of the second pose information includes estimating the second pose information based on a difference in position between feature points corresponding to each other among the extracted plurality of feature points and the reference feature points.

14. The method of claim 1, wherein the determining of the first pose information includes determining the first pose information based on the motion sensor information, and feature points of the object extracted from a previous image.

15. The method of claim 1, wherein the determining of the pose of the computing apparatus comprises determining a feature value indicating a position and an orientation of the computing apparatus.

16. The method of claim 15, further comprising displaying the AR content based on the feature value indicating the position and the orientation of the computing apparatus.

17. The method of claim 1, further comprising estimating the motion sensor information of the computing apparatus using a motion sensor of the computing apparatus.

18. The method of claim 1, further comprising:
obtaining a current image frame using an image sensor of the computing apparatus; and
extracting the one or more feature points of the object from the current image frame.

19. A non-transitory computer-readable storage medium storing instructions that, when executed by a processor, cause the processor to perform the method of claim 1.

20. A computing apparatus, the computing apparatus comprising:
a processor configured to:
determine first pose information of the computing apparatus dependent on motion sensor information of motion of the computing apparatus;
estimate second pose information of the computing apparatus dependent on feature point position information that is pre-defined for an object, and one or more feature points of the object that are extracted from an image captured by the computing apparatus;
determine respective reliability values of the first pose information and the second pose information based on the motion sensor information and extraction information of the extracted one or more feature points; and
determine a pose of the computing apparatus for augmented reality (AR) content based on the first pose information, the second pose information, and the respective reliability values.

21. The apparatus of claim 20, wherein, for the determining of the pose of the computing apparatus, the processor is configured to determine a feature value indicating a position and an orientation of the computing apparatus.

22. The apparatus of claim 21, further comprising a display,
wherein the processor is further configured to control a display of the AR content based on the feature value indicating the position and the orientation of the computing apparatus.

23. The apparatus of claim 20, further comprising a motion sensor configured to estimate the motion sensor information.

24. The apparatus of claim 20, further comprising an image sensor,
wherein, to perform the extraction of the one or more features, the processor is configured to obtain a current image frame using the image sensor, and extract the one or more feature points of the object from the current image frame.

25. The apparatus of claim 20, wherein, for the determining of the respective reliability values, the processor is configured to determine the respective reliability values based on a difference between a position of a feature point of the object at a current time estimated based on the motion sensor information and another position of the feature point of the object at the current time according to the extraction information, and based on determination of a reliability value of the first pose information to be higher than a reliability value of the second pose information when the difference satisfies a difference condition.

26. The apparatus of claim 20, wherein, for the determining of the respective reliability values, the processor is configured to determine the respective reliability values based on a degree of motion of the computing apparatus according to the motion sensor information, and based on a determination of a reliability value of the first pose information to be higher than a reliability value of the second pose information when the degree of motion satisfies a degree of motion condition.

27. The apparatus of claim 20,
wherein the processor is further configured to perform the extraction of the one or more feature points for the object, and
wherein, for the determining of the respective reliability values, the processor is configured to determine a reliability value of the second pose information to be higher than a reliability value of the first pose information when the extraction indicates that the object is in the image and when an image quality of the image satisfies an image quality condition.

28. A computing apparatus, the computing apparatus comprising:
a motion sensor configured to measure motion information of the computing apparatus;
an image sensor configured to capture an image;
a display; and
a processor configured to:
determine first pose information of the computing apparatus dependent on the motion information;
estimate second pose information of the computing apparatus dependent on feature point position information that is pre-defined for an object, and one or more feature points of the object that are extracted from the image;
determine respective reliability values of the first pose information and the second pose information;
estimate a pose of the computing apparatus based on the first pose information, the second pose information, and the respective reliability values;
generate AR content matching a real object based on the estimated pose; and
control the display to display the generated AR content.

29. The apparatus of claim 28, wherein, for the determining of the respective reliability values of the first pose information and the second pose information, the processor is configured to determine the respective reliability values of the first pose information and the second pose information based on the motion information and extraction information of the extracted one or more feature points.

30. The apparatus of claim 28,
wherein, for the estimation of the pose of the computing apparatus, the processor is configured to determine a feature value, indicating a position and an orientation of the computing apparatus, based on the first pose information, the second pose information, and the respective reliability values, and
wherein the processor is configured to perform the generation of the AR content based on the feature value.

* * * * *